July 19, 1966  M. G. SCHAEFFER  3,262,031
TUBULAR CAPACITOR HAVING CORONA PREVENTION MEANS
Filed July 2, 1964  2 Sheets-Sheet 1
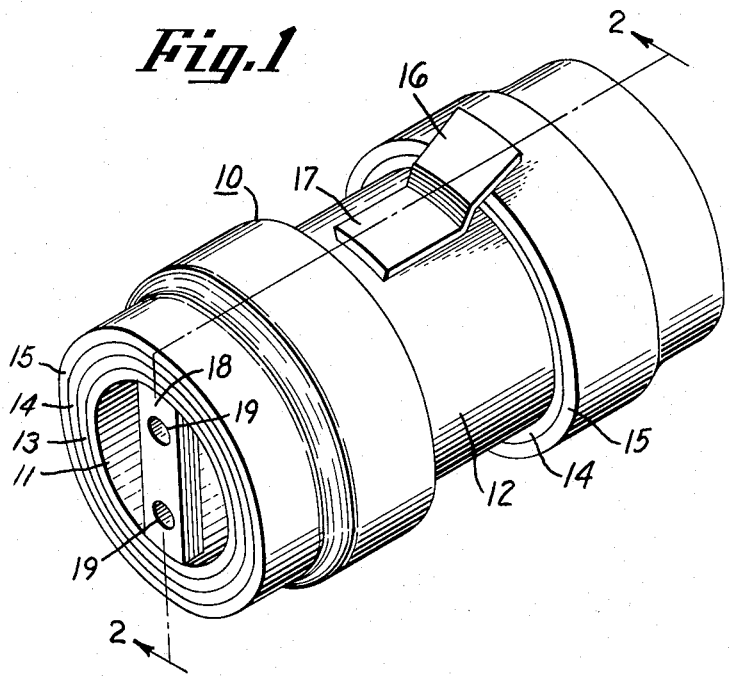
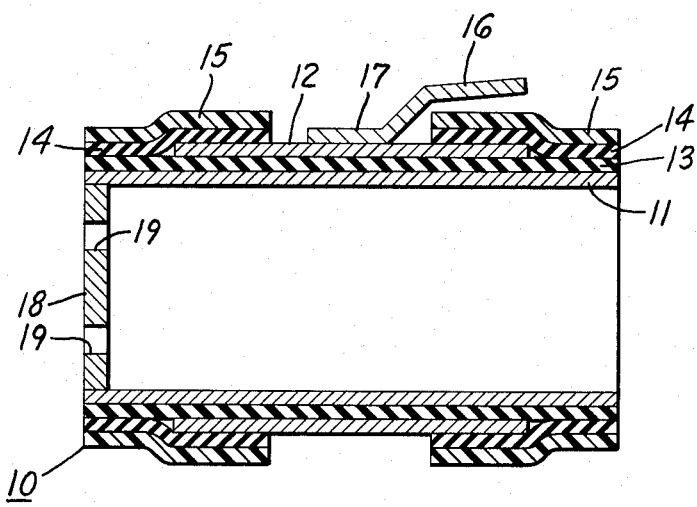
INVENTOR.
MARVIN G. SCHAEFFER
BY
*Albert H. Reuther*
ATTORNEY July 19, 1966  M. G. SCHAEFFER  3,262,031
TUBULAR CAPACITOR HAVING CORONA PREVENTION MEANS
Filed July 2, 1964  2 Sheets-Sheet 2
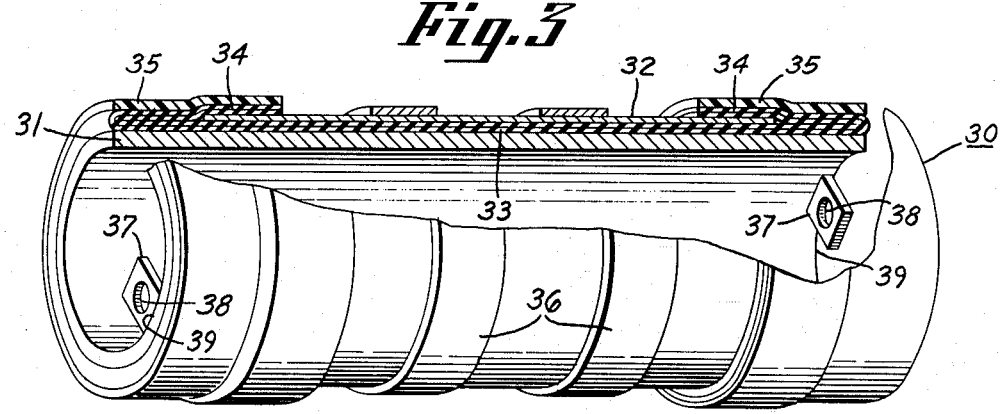
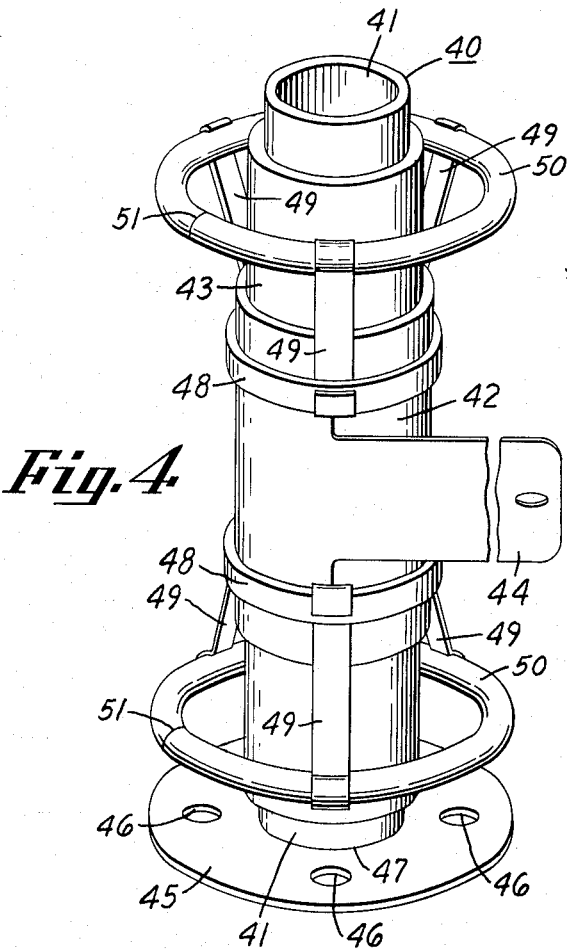
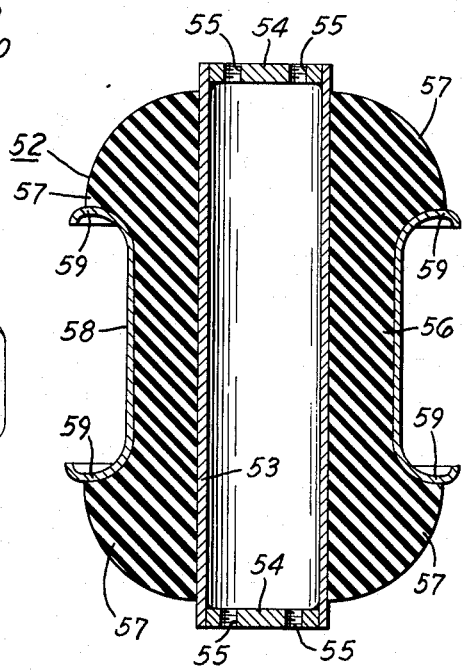
INVENTOR.
MARVIN G. SCHAEFFER
BY
Albert H. Reuther
ATTORNEY United States Patent Office 3,262,031
Patented July 19, 1966

3,262,031
TUBULAR CAPACITOR HAVING CORONA
PREVENTION MEANS
Marvin G. Schaeffer, Farmingham, Mich., assignor to General Motors Corporation, Detroit, Mich., a corporation of Delaware
Filed July 2, 1964, Ser. No. 379,957
5 Claims. (Cl. 317—242)

This invention relates to capacitor means and, more particularly, to structural arrangement and combination of materials for minimum cost as well as unique component characteristics.

On certain industrial capacitors it has been known to have a vacuum capacitor or air gap dielectric at considerable cost. An object of this invention is to provide improved capacitor means utilizing solid elastomeric dielectric sleeving and metal portions costing one-tenth or less of the cost of vacuum type capacitor means with air gap dielectric.

Another object of this invention is to provide a capacitor means structure including an inner tubular or pipe member having terminal mounting provision internally thereof. The member is surrounded concentrically first by a layering of dielectric rubbery material and then by an outer metal portion centrally exposed for lead connection. The outer metal portion is sealed with insulating material also including further dielectric rubbery material.

Another object of this invention is to provide a capacitor means structure including in combination an inner tubular or pipe member of copper having an outer diameter in a range between one and seven inches with terminal mounting provision internally thereof. The member is surrounded concentrically first by a layering of dielectric rubbery material for substantially full length thereof and then by an outer metal portion of less than full length centrally exposed. The outer metal portion is sealed at opposite ends with insulating material including polyester resin overlay thereon.

A further object of this invention is to provide a capacitor means structure including in combination an inner tubular or pipe member having terminal mounting provision internally thereof and surrounded concentrically first by a layering of dielectric rubbery material and then by an outer metal portion centrally exposed. The outer metal portion of the combination is held by annular clamping means as well as being sealed at opposite ends with insulating material including polyester resin overlay thereon.

Another object of this invention is to provide a radio frequency capacitor means with high voltage and current ratings as well as very desirable power loss and power factor characteristics and dielectric constant of substantially 10. These characteristics are obtained from concentrically arranged inner and outer tubing or annularly disposed plate means having solid dielectric of silicone-rubber-type material therebetween. There are clamping means secured centrally to the outer tubing means or plate means also having braces extending angularly therefrom for mounting of metal corona ring means concentrically and adjacent to opposite ends thereof subject to connection-mounting provision carried by the tubing and/or plate means.

Further objects and advantages will become apparent from the following description, reference being had to the accompanying drawings wherein preferred embodiments of the present invention are clearly shown.

In the drawings:
FIGURE 1 is a perspective view of capacitor means having features in accordance with the present invention.

FIGURE 2 is a longitudinally sectioned view of the capacitor means of FIGURE 1.

FIGURE 3 is a perspective view of a modification of capacitor means having features similar to those of FIGURES 1 and 2.

FIGURE 4 is a perspective view of a further embodiment of capacitor means in accordance with the present invention.

FIGURE 5 is a sectioned elevational view showing molded dielectric rubbery material on capacitor means.

FIGURES 1 and 2 illustrate capacitor means generally indicated by numeral 10 and having features in accordance with the present invention. The capacitor means 10 includes a first or inner tubular pipe-like member 11 as well as a second or outer annular metal member 12 extending concentrically of each other. The inner or first member 11 is greater in length than the second member 12. For purposes of illustration, it is noted that the first or inner member 11 is a copper pipe having a five inch internal diameter and extending substantially nine inches longitudinally as a grounding plate. The second or outer metal member 12 is also made of copper which for purposes of illustration has a width of six inches, circumference of substantially nineteen inches and a thickness of fifteen thousandths of an inch. Located concentrically between the first and second members 11–12 there is an intermediate or dielectric portion 13 of solid silicone-rubber-type insulating material extending for substantially the same length or for example nine inches as the length of the first or inner member 11 and having a circumference of substantially nineteen inches. Also as can be seen in views of FIGURES 1 and 2, there is a seal of further dielectric rubber material indicated as sleeving or band portions 14 at each of opposite ends. This sleeving 14 as well as the intermediate portion 13 has a composition of material fully disclosed in Patent 2,922,865, Schattler et al., issued January 26, 1960 and belonging to the assignee of the present invention. Details of the specific materials and examples of compositions given by this patent are hereby incorporated by reference thereto such that repeating details thereof is being left as the subject of this additional patent disclosure. It is to be noted however, that each of opposite ends of sleeving 14 illustrated in views of FIGURES 1 and 2 of the drawings of the present disclosure can further be provided with a polyester resin tape wrapping 15. Such tape wrapping 15 as commercially available is known by a trade name "Mylar" which is a polyester film of polyethylene terephthalate resin.

A lead connection or terminal means 16 is secured by suitable sweat soldering at one end 17 thereof directly to an exposed central location of the annular plate or tubing member 12. This terminal connection 16–17 can also be made of copper as a strap having a thickness of ten-thousandths of an inch and a width of four inches as well as a suitable length such as ten inches.

As also illustrated in views of FIGURES 1 and 2, further terminal-mounting means such as a brass bar portion 18 secured at opposite ends thereof to inner periphery of the first or inner member 11 is provided with mounting openings 19. The mounting or bar means 18 as silver soldered at opposite ends has a length of substantially five inches as well as a width of approximately two inches and a height or depth of substantially one quarter inch. The capacitor means 10 of FIGURES 1 and 2 is adapted to withstand a minimum of thirty-two thousand volts direct current prior to installation of banding or sleeve means 14 having a length of substantially three inches to overlap both the second or outer plate means 12 and the dielectric silicone-rubber-type intermediate portion 13. After installation of the banding or sleeve means 14 the capacitor means is adapted to be tested for leakage with no more than twenty-five thousand volts direct current since possible flashover at this time might damage capacitor components sufficiently to require rebuilding which can be readily accomplished as is evident by the minimum number of components. The resulting capacitor means of the sample dimensions given results in a one thousand mmf. radio-frequency bypass capacitor using the dielectric rubbery intermediate portion 13 having a dielectric constant in the neighborhood of 10 and also very desirable power loss and power factor characteristics.

FIGURE 3 illustrates a capacitor means generally indicated by numeral 30. This capacitor means 30 includes a first or inner tubular portion 31 as well as a second or outer metal plate portion 32 concentrically arranged and separated by an intermediate solid dielectric portion 33 of silicone-rubber-type insulating material noted earlier for the embodiment of FIGURES 1 and 2. Reference can be made again to Patent 2,922,865—Schattler et al. dated January 26, 1960 for specific details as to this dielectric material. In the embodiment of FIGURE 3, the first or inner tubular member 31 is made of copper having a thickness of one hundred thirty-four thousandths of an inch in a wall thereof as well as a length of substantially nine inches and an outer diameter of substantially six and one-eighth inches. The second or outer plate portion 32 has a width of only six inches and is thus shorter than the nine inch length of the first tubular portion 31. The second or outer portion 32 is substantially sixteen thousandths of an inch thick with a circumference of substantially twenty inches for copper thereof. The dielectric intermediate portion 33 in the embodiment of FIGURE 3 has opposite ends 34 thereof folded back over opposite periphery of the second metal portion 32 at both ends. A polyester resin or Mylar tape wrapping 35 is provided to overlay each of opposite end areas including the folded back portions 34. An example of the size of the intermediate portion 33 including the folded back portions 34 thereof is given as thirty thousandths of an inch thickness by fifteen inch width and forty inch circumference approximately.

In the embodiment of FIGURE 3, the second metal portion 32 is a copper plate having a thickness of substantially sixteen thousandths of an inch, a width of six inches which is less than the length of nine inches for the first or inner tubing portion 31 and finally a circumference of twenty inches for the second portion 32. A pair of stainless steel circular or annular clamping means 36 can be provided peripherally in a centrally exposed location of the second or outer plate portion 32. Suitable terminal mounting can be provided therewith and at either or both of opposite ends a terminal means 37 having a tapped aperture 38 centrally thereof can be silver-soldered in place along a semi-arcuate edging 39 thereof. This terminal means 37 can have a size of one inch by one inch by one fourth inch for example and can be made of copper material. The capacitor means illustrated in FIGURE 3 is adapted to withstand forty thousand volts with no more than five micro-amperes leakage and capable of functioning as a one thousand mmf. radio-frequency feedthrough capacitor.

FIGURE 4 shows a capacitor means generally indicated by numeral 40 including an inner or first tubular portion 41 of metal as well as an outer annular metal plate portion 42. The inner and outer portions 41 and 42 are located concentrically as to each other with an intermediate solid dielectric portion 43 of silicone-rubber-type material having a composition as disclosed by Patent 2,922,865—Schattler et al. issued January 26, 1960 and belonging to the assignee of the present invention. The outer metal portion 42 has an annular configuration with a connection strap portion 44 optionally formed as a continuation of the outer plate portion 42. This outer plate portion has a thickness of substantially fifteen-thousandths of an inch as well as a width of two inches and length of six and one-half inches annularly including the integral strap connection to have a width of only substantially one inch and a length of twelve inches for example. The copper outer portion 42 is thus shorter longitudinally or axially of the capacitor means than the first tubular portion 41 also of copper material which for example is eight inches long with an outer diameter of substantially one and three-eighths inches. The intermediate solid dielectric portion 43 is exposed along outer periphery adjacent to opposite ends thereof and can include plural layering or wrappings up to eight in number each having a thickness of one thirty-second of an inch with a width of six inches and a circumference of forty-one inches total.

Adjacent to one end of the inner or first tubular portion 41 there can be secured a mounting flange portion 45 having a plurality of openings 46 as well as a central or inner periphery 47. This mounting flange portion 45 can also be made of copper material having a diameter of two and one-half inches and a thickness of one-sixteenth of an inch with the inner peripheral edging 47 suitably secured such as by silver-soldering to one end of the first tubular portion 41.

Since the second portion 42 is wider than the strap portion 44 it is possible to provide a pair of annular clamping means or pipe-like fasteners 48 directly on an exposed central portion of the second plate means 42 though spaced away from each other sufficiently for passage of strap 44 tangentially therebetween.

Further in accordance with the present invention, a plurality of braces or supporting means 49 can be secured together with the clamping means 48 adjacent to each of opposite ends of the second plate means 42. These braces or support means 49 extend at an acute angle laterally outwardly in opposite directions with radially outer ends thereof being bent to hold corona ring means 50 in predetermined locations concentrically and radially outwardly from the opposite ends of the dielectric portion 43. Each of these corona ring means 50 can be made of copper tubing having a three-eighths of an inch outer diameter per se formed into an annular configuration to have an overall outer diameter of three and seven-eighths inches. The corona ring means are spaced axially and longitudinally as well as concentrically as to each other at a distance of substantially four inches apart. The braces or support means 49 can be made of copper strips having a thickness of fifteen-thousandths of an inch and a length of substantially three-fourths of an inch laterally. Thus a spacing of substantially three-fourths of an inch of the corona ring means to the silicone-rubber-type intermediate portion 43 is obtained. Abutting ends of the corona ring means can be joined by soldering at a juncture 51. The corona ring means are advantageous particularly for radio-frequency capacitor means and the structure illustrated in FIGURE 4 is rated at forty thousand volts and fifty amperes for a twenty-five pf. capacitor.

FIGURE 5 shows a capacitor means generally indicated by numeral 52 having a silver-plated cylindrical copper core or inner member 53, with transverse bar means 54 having tapped mounting holes 55 similar to structure of FIGURES 1 and 2. However, in structure of FIGURE 5 there is provided a molded silicone rubber material of the type composition noted earlier and designated by reference numeral 56 with integral outwardly curved and bulging ends 57. Provision of moldable silicone rubbery dielectric material permits holding in situ an outwardly-flared silver-plated copper outer ring means 58 with opposite annular edging 59 anchoring the ends 57 against axial displacement therebetween. It is to be understood that suitable electrical or terminal connection not shown in FIGURE 5 can be provided in a manner similar to that shown and described previously in this disclosure. The capacitor structure of FIGURE 5 showing molded configuration of rubbery dielectric material is adapted to be suitable for high frequency use at high voltage and high current operation.

While the embodiments of the present invention as herein disclosed constitute preferred forms, it is to be understood that other forms might be adopted.

What is claimed is as follows:

1. A capacitor structure comprising, an inner tubular portion of metal as well as an outer tubular plate portion also of metal concentrically located as to each other, an intermediate solid rubbery dielectric portion, and terminal mounting means carried by at least one metal portion, said outer plate portion having a central peripheral exposure though less in length axially than said inner portion, said intermediate solid rubbery dielectric portion having an axial length greater than that of said outer plate portion for exposure of opposite ends thereof, said structure including clamping means on said outer tubular portion to secure braces that extend angularly outwardly in opposite directions axially away from each other, and corona ring means secured to said braces outwardly and concentrically at predetermined spacing from said intermediate solid rubbery dielectric portion.

2. A capacitor means structure, comprising, in combination, an inner tubular member having terminal mounting provision thereon, a continuous tubular layer of solid dielectric rubbery material of less axial length than said inner tubular member and concentrically surrounding said inner tubular member, an outer metal portion of less axial length than both that of said inner tubular member as well as that of said dielectric rubbery material and centrally exposed for lead connection, and a pair of corona ring means each concentric as to said inner tubular member as well as said layer of solid dielectric rubbery material and each being mounted on said outer metal portion axially on opposite sides thereof.

3. The combination of claim 2 wherein said corona ring means are copper tubing having a juncture of abutting ends thereof in a closed loop located radially outwardly from said layer of oppositely exposed solid dielectric rubbery material and in axially opposite as well as radially outward locations from said outer metal portion.

4. The combination of claim 2 wherein said outer metal portion has a strap terminal ending in a tongue-like continuation thereof and a radially outwardly extending mounting flange is carried by one end of said inner tubular member.

5. On a capacitor structure having an inner tubular portion of metal as well as an outer tubular plate portion also of metal though of axial length less than that of said inner metal tubular portion, the combination therewith which comprises an intermediate dielectric portion of silicon-rubber-type material having an axial length greater than that of the outer tubular plate, said silicon-rubber-type material having a dielectric constant and being suitable for high frequency capacitor use at high voltage and high current operation, said silicone-rubber-type material having opposite tubular axial ends located radially inwardly from a pair of corona ring means held by angularly disposed brackets secured to the outer tubular plate portion directly by corresponding clamping means, said pairs of corona ring means being advantageous particularly for radio-frequency capacitive operation.

References Cited by the Examiner

UNITED STATES PATENTS

| 2,251,534 | 8/1941 | Usselman | 317—242 X |
| 2,922,865 | 1/1960 | Schattler et al. | 219—10.81 X |
| 3,001,267 | 9/1961 | Heibel et al. | 317—242 X |

FOREIGN PATENTS

| 169,518 | 11/1951 | Austria. |
| 1,000,191 | 10/1951 | France. |
| 1,209,116 | 9/1959 | France. |
| 1,218,515 | 12/1959 | France. |

OTHER REFERENCES

Birks: Modern Dielectric Materials, Heywood & Company Ltd., London, 1960, page 150 relied on.

Stettner: German App. No. 1,041,159, pub. Oct. 16, 1958.

LARAMIE E. ASKIN, *Primary Examiner.*

JOHN F. BURNS, ROBERT K. SCHAEFER, *Examiners.*

D. J. BADER, *Assistant Examiner.*